United States Patent
Goldstone et al.

(10) Patent No.: US 10,713,630 B2
(45) Date of Patent: *Jul. 14, 2020

(54) APPARATUS AND METHOD FOR PURCHASING A PRODUCT USING AN ELECTRONIC DEVICE

(71) Applicant: Barclays Bank PLC, London, Greater London (GB)

(72) Inventors: Jeremy Goldstone, Cheshire (GB); Lawrence Cheng, Cheshire (GB)

(73) Assignee: BARCLAYS EXECUTION SERVICES LIMITED, London (GB)

( * ) Notice: Subject to any disclaimer, the term of this patent is extended or adjusted under 35 U.S.C. 154(b) by 890 days.

This patent is subject to a terminal disclaimer.

(21) Appl. No.: 14/768,904

(22) PCT Filed: Feb. 20, 2014

(86) PCT No.: PCT/EP2014/053366
§ 371 (c)(1),
(2) Date: Aug. 19, 2015

(87) PCT Pub. No.: WO2014/128229
PCT Pub. Date: Aug. 28, 2014

(65) Prior Publication Data
US 2016/0005043 A1    Jan. 7, 2016

(30) Foreign Application Priority Data

Feb. 20, 2013  (GB) .................... 1302993.9
Apr. 30, 2013  (WO) ............... PCT/EP2013/059046
May 2, 2013   (GB) .................... 1307970.2

(51) Int. Cl.
*G06Q 20/40* (2012.01)
*G06Q 20/32* (2012.01)
(Continued)

(52) U.S. Cl.
CPC ......... *G06Q 20/108* (2013.01); *G06F 16/955* (2019.01); *G06F 16/9535* (2019.01);
(Continued)

(58) Field of Classification Search
CPC .............................. G06Q 20/40; G06Q 20/32
(Continued)

(56) References Cited

U.S. PATENT DOCUMENTS

2002/0152165 A1  10/2002 Dutta et al.
2005/0009564 A1  1/2005 Hayaashi et al.
(Continued)

FOREIGN PATENT DOCUMENTS

CN    102915496    2/2013
EP    2631860      8/2013
(Continued)

OTHER PUBLICATIONS

International Patent Application No. PCT/EP2013/059046, Notification of Transmittal of the International Search Report and the Written Opinion of the International Searching Authority, or the Declaration, dated Nov. 22, 2013, 8 pages.
(Continued)

*Primary Examiner* — Hai Tran
(74) *Attorney, Agent, or Firm* — Morgan, Lewis & Bockius LLP

(57) ABSTRACT

The present disclosure relates to a method and apparatus for purchasing a product from a merchant by a consumer using an electronic device. An association between a transaction identifier and transaction information is stored in a database, the transaction information comprising a merchant identifier, which is associated with merchant information, and a transaction amount. The consumer may purchase the product by having the transaction identifier provided to an application on an electronic device and transmitting the
(Continued)

transaction identifier from the application to a transaction processing server. The merchant information and the transaction amount associated with the transaction identifier is transmitted from the transaction processing server to the application and the transaction completed using the application on the basis of the transaction information on the database.

19 Claims, 8 Drawing Sheets

(51) Int. Cl.
    *G06Q 20/10*     (2012.01)
    *G06F 16/955*     (2019.01)
    *G06F 16/9535*     (2019.01)
    *G06Q 20/12*     (2012.01)
    *G06Q 10/08*     (2012.01)

(52) U.S. Cl.
    CPC .......... *G06Q 10/087* (2013.01); *G06Q 20/12* (2013.01); *G06Q 20/3223* (2013.01); *G06Q 20/3226* (2013.01); *G06Q 20/3276* (2013.01); *G06Q 20/4014* (2013.01)

(58) Field of Classification Search
    USPC ........................................................ 705/44
    See application file for complete search history.

(56) References Cited

U.S. PATENT DOCUMENTS

| | | | |
|---|---|---|---|
| 2005/0125301 A1* | 6/2005 | Muni ................... | G06Q 20/208 705/23 |
| 2011/0137742 A1* | 6/2011 | Parikh .................. | G06Q 20/04 705/26.1 |
| 2011/0251910 A1 | 10/2011 | Dimmick | |
| 2011/0311164 A1 | 12/2011 | Badharudeen et al. | |
| 2012/0136739 A1 | 5/2012 | Chung | |
| 2012/0267432 A1* | 10/2012 | Kuttuva ............... | G06Q 20/223 235/379 |
| 2012/0284130 A1 | 11/2012 | Lewis et al. | |
| 2012/0330844 A1* | 12/2012 | Kaufman ............. | G06Q 20/027 705/67 |

FOREIGN PATENT DOCUMENTS

| | | |
|---|---|---|
| GB | 2481663 | 1/2012 |
| GB | 2489332 | 9/2012 |
| GB | 2510585 | 8/2014 |
| JP | 2008-171354 | 7/2008 |
| KR | 10-2012-0013294 | 2/2012 |
| WO | WO 01/97105 | 12/2001 |
| WO | WO 2013/156796 | 10/2013 |
| WO | WO 2013/156797 | 10/2013 |
| WO | WO 2013/156798 | 10/2013 |
| WO | WO 2013/156799 | 10/2013 |
| WO | WO 2013/156800 | 10/2013 |

OTHER PUBLICATIONS

GitHub, "Official ZXing ("Zebra Crossing") Project Home", http://github.com/zxing/zxing, accessed Aug. 18, 2015, 3 pages.
Github, "QRGen: A Simple QRCode Generation api for java built on top ZXING", https://github.com/kenglxn/QRGen, Accessed Aug. 18, 2015, 4 pages.
Github, "myang-git/ QR-Code-Encoder-for-Objective-C", https://github.com/myang-git/QR-Code-Encoder-for-objective-C, accessed Aug. 18, 2015, 3 pages.
"iPhone QR Code Generator Generate , Create 2d barcode QR Code Images in iPhone (IOS) Application" http://www.onbarcode.com/products/iphone_barcode/barcodes/qrcode.html, Accessed Aug. 18, 2015, 4 pages.
Great Britain Patent Application No. 1302993.9, Search Report, dated Aug. 16, 2013, 5 pages.
"HSBC has New Personalized Touchscreen ATMs", Asian Banking & Finance, Dec. 2009, accessed Aug. 15, 2013, 5 pages.
Great Britain Patent Application No. 1307970.2, Search Report, dated Oct. 31, 2013, 4 pages.
Tesco PLC, "Tesco Opens Worlds first Virtual Store", http://www.tescoplc.com/index.asp?pageid=newsid=345,Aug. 25, 2011, accessed Aug. 15, 2013, 2 pages.
Tesco PLC, "Fed up of Coming home from Holiday to an Empty Fridge?", http://www.tescoplc.com/index.asp? pageid=17&newsid=664, Aug. 7, 2012, accessed Aug. 15, 2013, 4 pages.
Anonymous: "Transport Layer Security—Wikipedia", Jan. 17, 2011, XP055444248, URL:https://en.wikipedia.org/w/index.php?title=Transport_Layer_Security&oldid=408431665.

\* cited by examiner

APPARATUS AND METHOD FOR PURCHASING A PRODUCT USING AN ELECTRONIC DEVICE

TECHNICAL FIELD

The present disclosure relates to an apparatus and method for purchasing a product using an electronic device.

BACKGROUND

When purchasing a product, or products, from a merchant's website using an electronic device, such as a desktop computer or a tablet computer, a consumer will usually put the product(s) in the website's 'shopping basket' and then proceed to the 'checkout' to purchase the product. In order to purchase the product, the consumer will need to submit to the merchant their payment details and any other personal details that the merchant may require, for example delivery address and, if they are purchasing an age restricted product, their date of birth.

Entering all of this information each time the consumer shops on-line, whether with the same merchant or with different merchants, can be time consuming. In order to overcome this, the consumer may save their payment details and personal details on their electronic device so that all of the required information can be auto-completed and then transmitted to the merchant without requiring manual data entry from the consumer. However, storing these details on an electronic device can represent a security risk, as can the transmission of the details over the internet. Furthermore, sharing the details with a merchant may represent a security risk. Firstly, the consumer may not trust a particular merchant with their details, or that what the consumer thought was the merchant's website is in fact a third party's website imitating the merchant's website, in which case their details will have been shared with a $3^{rd}$ party. Even when their details are shared with a trustworthy merchant, where details may be stored at multiple different locations there is a greater chance that the details may be compromised.

Rather than storing payment and personal details on the consumer's electronic device, the consumer may store their details with the merchant so that each time they purchase a product from the merchant, the consumer details may be auto-completed on the website. However, this means that the consumer's payment details will be stored with every different merchant that they use, which increases the number of locations where their details are stored, thus increasing the security risk. Furthermore, whenever the consumer purchases a product from a merchant for the first time, they will need manually to enter their payment and personal details with that merchant, which is time consuming.

From a merchant's perspective, personal details entered by the consumer, for example delivery address and/or date of birth, may not necessarily be trustworthy. This may represent a risk to the merchant because, for example, they may be unsure that they are selling an age restricted product to a consumer of a suitable age, or that they will be able successful to fulfil delivery of purchased goods. Furthermore, handling of transaction details and personal details may represent an additional burden on the merchant, not only because they will need to take steps to complete the transaction, but also because of the additional data security requirements that they should meet when handling such information.

SUMMARY

In a first aspect of the present disclosure, there is provided a server for use in the purchase of a product from a merchant by a consumer using an electronic device, the server being configured to: store in a database an association between a transaction identifier and transaction information, the transaction information comprising a merchant identifier, which is associated with merchant information, and a transaction amount; and transmit the transaction identifier to a first terminal.

By storing the association between the transaction identifier and the merchant identifier and transaction amount, the consumer can use the transaction identifier to check the transaction details are correct before confirming the transaction, thus improving security for the consumer.

The transaction identifier may be generated by the server on the basis of the merchant identifier and transaction amount that it has received from a merchant server. The merchant identifier and transaction amount received may be in an encrypted form and/or use integrity controls. For example, a symmetric key technique, such as keyed-hash message authentication code (HMAC), may be employed, whereby a symmetric key is shared between the server and the merchant server so that the server may verify that the transaction identifier has originated from the correct merchant server and has not been tampered with. In this way, the server may be sure of the integrity of the merchant identifier and the transaction amount. All subsequent communication between the merchant server and the server may also have similar encryption and/or integrity controls applied so that the data cannot be tampered with.

The transaction identifier may be transmitted to the first terminal for display on a browser of the first terminal in a graphical form, for example a QR code. The consumer may then scan the transaction identifier using a transaction provider's app on a mobile terminal, such that the app may make use of the transaction identifier and the associated transaction information to carry out the transaction. Thus, the consumer does not need to enter any account details into the merchant's website, which saves time, or store any details on the first terminal or on a merchant server, as all of the relevant details are securely stored by the transaction provider.

Furthermore, by saving the merchant ID and basket amount on the database using integrity controls to limit what entities can create and save the information, the consumer may receive confirmation after scanning the graphical representation of the transaction identifier of the merchant that they will be paying and the amount that they will be paying to the merchant before the transaction takes place. Because the merchant ID reliably identifies a particular merchant registered for that merchant ID, the consumer may confirm the payee and transaction amount prior to authorising the transaction, thus providing two-factor consumer verification. This improves security by ensuring that they will not accidently pay a third party who is imitating the merchant using, for example, a phishing website.

The transaction information stored in the database may also include an attribute query, for example what delivery address should be used for the product and/or what the age of the consumer is. That attribute query may be communicated to the app during the transaction so that the consumer can answer the query and update the transaction information on the database accordingly, either by inputting the required data themselves, or indicating that attribute information that they have registered with the transaction provider, or any other external source may be used. The server may then generate an attribute token for transmitting to the merchant, which may comprise both the requested attribute and an indicator of how reliable the attribute is (i.e. if it has been input by the consumer, in which case its reliability may be doubtful, or if it has been registered with and verified by the transaction provider, in which case it may be trustworthy). This process both saves the consumer time since they do not have to enter their attribute details for each new transaction, or for each new merchant they are purchasing from, improves security for consumers as they will not need to save their attribute details to their electronic devices and improves the reliability of attribute information for merchants.

In response to the attribute token, the merchant may return an update to the transaction information, for example a delivery cost calculated on the basis of the delivery address, so that the transaction information may be updated and the consumer notified via the transaction provider's app before the transaction takes place.

In a second aspect of the present disclosure, there is provided a transaction processing server for use in the purchase of a product from a merchant by a consumer using an electronic device, the transaction processing server being configured: receive from an application on the electronic device a transaction identifier; obtain from a database merchant information and a transaction amount from transaction information associated with the transaction identifier on the database; and transmit the transaction amount and merchant information to the application on the electronic device.

Communication between the application and the transaction processing server may take place via a secure connection, such as SSL, to ensure that the communication cannot be tampered with by third parties.

By transmitting the transaction amount and merchant information to the application, the consumer using the application may verify that the transaction will be to the correct merchant and for the correct amount before the transaction takes place, which, as explained above, improves security.

The transaction processing server may also transmit to the application any attribute queries that there are in the transaction information and process the attribute information returned from the application.

Upon instruction from the application, the transaction processing server can execute the transaction between the consumer and merchant on the basis of the transaction information stored in the database, for example by communicating with the relevant financial accounts and payment schemes. The source of funds registered with the transaction provider by the consumer and the merchant account registered with the transaction provider by the merchant may be used in the transaction. In this way, the transaction may be executed without the consumer needing to share their financial details with the merchant, or any other external parties, which improves security. Furthermore, they do not need to transmit their security details to execute the transaction, again improving security.

In a third aspect of the present disclosure there is provided a system comprising the server and the transaction processing server.

In a fourth aspect of the present disclosure, there is provided an application for operation on an electronic device, wherein the application is suitable for use by a consumer purchasing a product from a merchant, wherein the application comprises logic configured to: receive a transaction identifier, wherein the transaction identifier is associated on a database with transaction information, the transaction information comprising a merchant identifier, which is associated with merchant information, and a transaction amount; transmit the transaction identifier; receive the merchant information and the transaction amount in response to the transmitted transaction identifier; and complete the transaction on the basis of the merchant information and the transaction amount.

For the reasons explained above, use of this application will not only improve a consumer's shopping experience by eliminating the need to input payment details and personal information, but it also improves the security of the transaction.

In a fifth aspect of the present disclosure, there is provided a method for purchasing a product from a merchant by a consumer using an electronic device, the method comprising the steps of: storing in a database an association between a transaction identifier and transaction information, the transaction information comprising a merchant identifier, which is associated with merchant information, and a transaction amount; providing the transaction identifier to an application on an electronic device; transmitting the transaction identifier from the application to a transaction processing server; transmitting the merchant information and the transaction amount associated with the transaction identifier from the transaction processing server to the application; and completing the transaction using the application on the basis of the transaction information on the database.

Again, as explained above, carrying out this method not only improves a consumer's shopping experience by eliminating the need to input payment details and personal information, but it also improves the security of the transaction.

BRIEF DESCRIPTION OF THE DRAWINGS

An apparatus and method of the present disclosure is described, by way of example only, with reference to the following drawings in which:

FIG. 5 shows a confirmation of transaction sequence diagram for.

DETAILED DESCRIPTION

Figure 1:
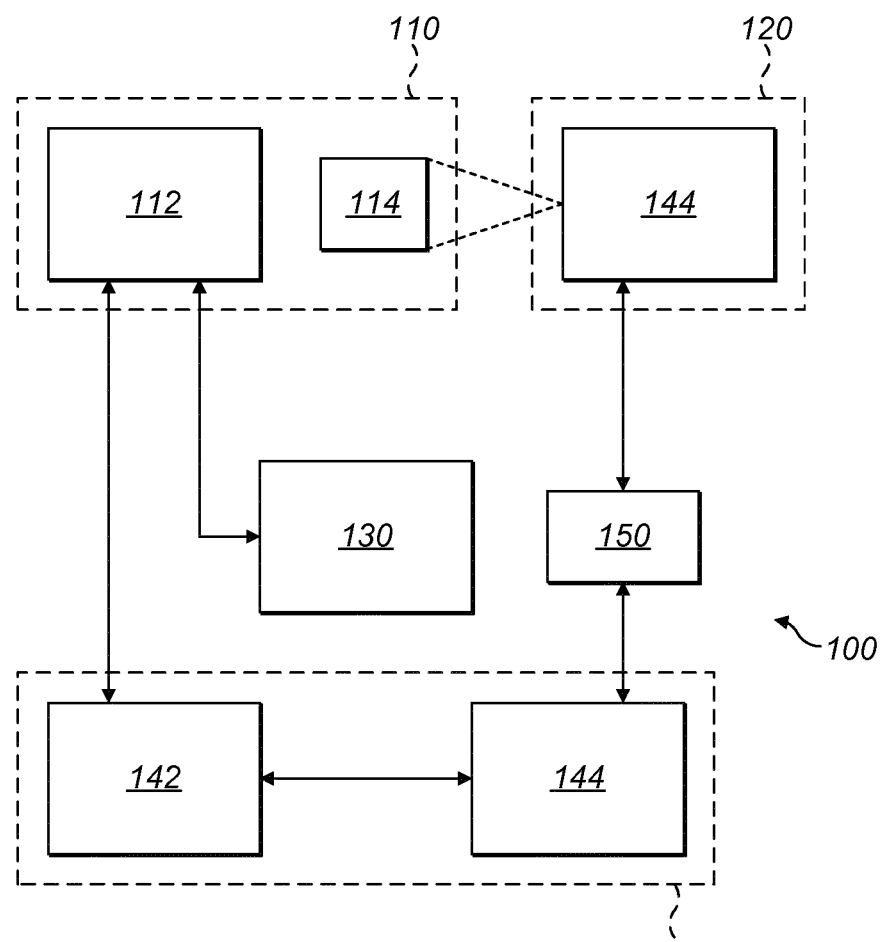
FIG. 1 shows a system comprising a terminal, a mobile terminal, a merchant server and a transaction server.

FIG. 1 shows a system 100 comprising a terminal 110, a mobile terminal 120, a merchant server 130, a transaction server 140 and a communications gateway 150. The first terminal 110, which may be, for example, a static terminal such as a desktop computer, or a mobile terminal such as a tablet computer, comprises a browser 112, which is in communication with the merchant server 130. The mobile terminal 120, which may be, for example, a tablet computer or a smart phone, comprises a transaction application 122, referred to from hereon as an 'app'. The browser 112 is capable of displaying a QR code 114 on a display means of the terminal 110, wherein the QR code 114 may be scanned by the app 122 using an imaging device on the mobile terminal 120.

The server 140 comprises a transaction provider node 142, which is in communication with the browser 112, and a database 144, which is in communication with the app 122 via communications gateway 150.

Figure 2:
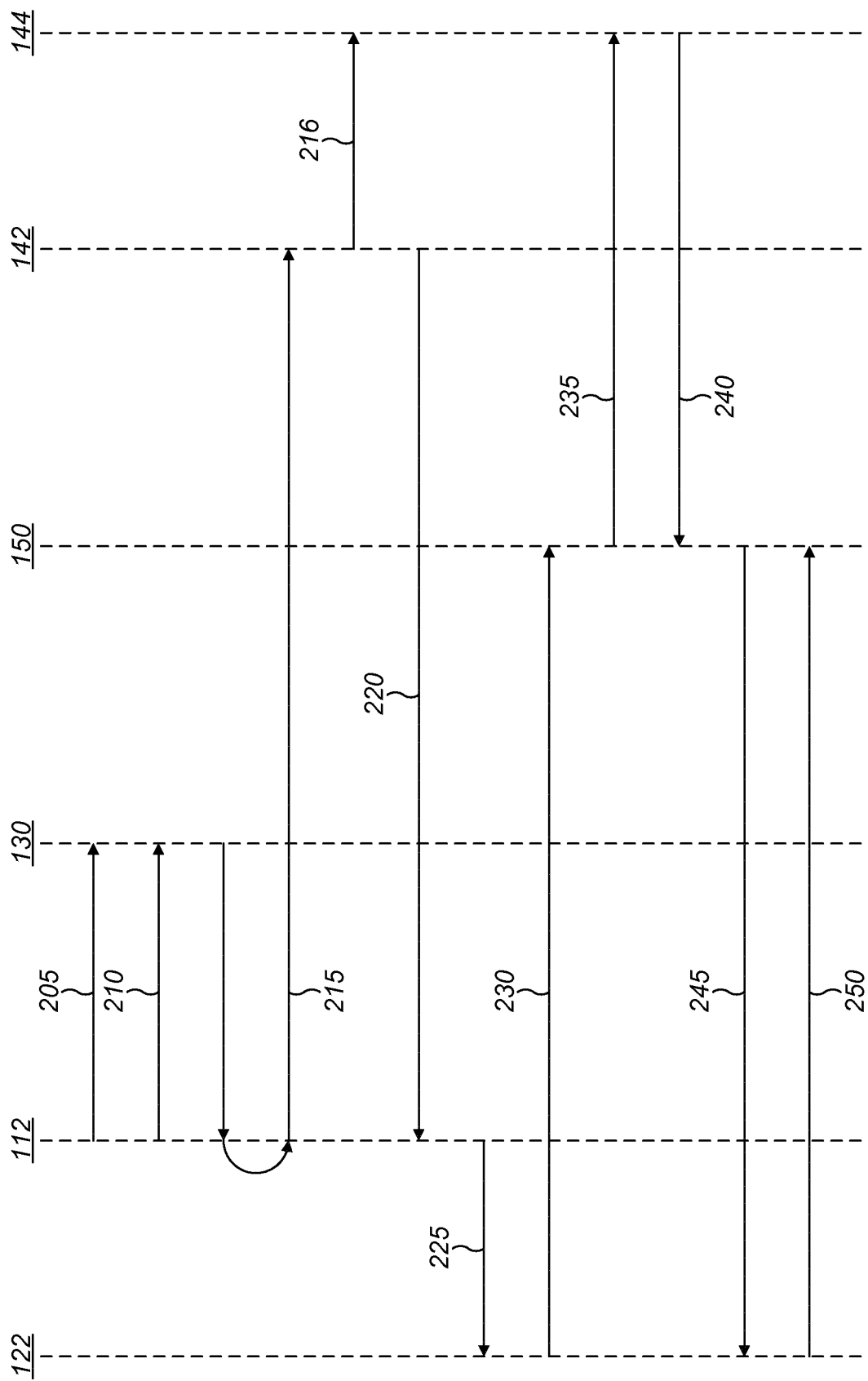
FIG. 2 shows a sequence diagram for the system shown in FIG. 1 when the consumer is purchasing a product from the merchant.

FIG. 2 shows a sequence diagram representing the data flow that may take place as part of a transaction between a consumer using the terminal 110 and the mobile terminal 120 to buy a product from the merchant using the transaction service provided by the transaction provider. The term 'product' as used throughout this disclosure encompasses both goods and services (e.g. financial products).

The consumer may use the browser 112 to browse for a product or products on the merchant's website. When the consumer decides to purchase the product(s), they may put the product(s) in their 'shopping basket' and enter the checkout process in data transfer 205 between the browser 112 and the merchant server 130.

If the product will ultimately require delivery to the consumer and the merchant offers the consumer straightforward delivery options, for example expedited delivery or standard delivery, this may also be selected by the consumer when entering the checkout process, and the delivery information, for example cost and type of delivery and expected delivery date etc, may also be included in data transfer 205.

After data transfer 205, the merchant server 130 will be aware that a consumer wishes to purchase a particular product(s) and, if applicable, the details of the delivery type chosen by the consumer. The merchant server 130 may then request from the transaction provider their merchant ID, for example using a transaction provider API. Such an API may be provided to each merchant when signing up to the transaction service. The use of this API allows merchants to be set up without requiring extensive changes to their online stores and web sites. The merchant ID is a unique code that is assigned to the merchant by the transaction provider. The merchant ID may be assigned to the merchant when the merchant signs up to the transaction provider's service, at which time all of the merchant's details, for example the merchant name and payment details, may be verified by the transaction provider so that the merchant details associated with the merchant ID are reliable.

In this way, whenever the merchant ID is used during a transaction (as explained further below), for example to identify to whom a payment for a product(s) should be made, the correct merchant is indentified.

The merchant server 130 may also generate a tracking reference, which is a unique code that may subsequently be used by the merchant and consumer to identify the transaction.

Having entered the checkout process, the consumer may use data transfer 210 to indicate to the merchant server 130 that they would like to complete the transaction with the QR code transaction process offered by the transaction provider. This step may be carried out by selecting an option displayed on the merchant's checkout page on the browser 112.

Having been informed that the consumer would like to use the transaction provider's service, the merchant server 130 transmits the transaction information, comprising the merchant ID, the tracking reference and a basket amount, which indicates the total costs of all of the products in the consumer's basket, to the transaction provider node 142. The transaction information may also comprise any other relevant information, for example any delivery information and/or delivery costs that the consumer may already have selected and a product description and/or product photograph for each product in the basket. This data transfer may take place via the browser 112, as shown in FIG. 2 as data transfer 215, so that server-to-server communication between the merchant server 130 and the transaction provider node 142 does not need to be set up.

So that the transaction provider node 142 may verify who the data transfer 215 has come from, and that the data has not been tampered with, encryption or other integrity controls may be applied. For example, a symmetric key technique, such as keyed-hash message authentication code (HMAC), may be employed, whereby a symmetric key is shared between the merchant and the transaction provider when the merchant initially registers with the transaction provider. The merchant server 130 may then apply the symmetric key to the transaction information to be transferred in data transfer 215 and transmit the MAC alongside the transaction information in data transfer 215. Upon receipt of data transfer 215, the transaction provider node 142 may use the merchant ID to retrieve the symmetric key associated with that merchant, for example from a hardware protected key stored (HSM) where the symmetric key may be stored and associated with the merchant ID, and use the symmetric key and MAC to verify the transaction information.

The symmetric key issued to the merchant may be stored by the merchant using software, or more preferably it may be stored in a hardware protected key store (HSM) for additional security. For some merchants, particularly larger merchants, the transaction provider may mandate that an HSM is used.

If the verification process identifies unreliable transaction information, for example from an HMAC verification error or an incorrect decryption of encrypted data, which might be caused by data tampering during data transfer 215, or data transfer 215 having originated from the wrong party, the transaction provider node 142 will not carry out any further steps in the process. An error message may be returned to the browser 112 to indicate that the transaction provider's service could not be provided on this occasion, which may also notify the consumer that there is a security issue related to the merchant website that they are using.

If, however, data transfer 215 is verified (i.e. the data has not been tampered with and has come from the correct sender), the transaction provider node 142 will generate a transaction identifier, for example a nonce, that is then transmitted to the database 144 with the transaction information in data transfer 216 and linked to the transaction information on the database 144. For each transaction, there will be a single unique transaction identifier such that each transaction identifier references a particular transaction.

The transaction provider node 142 then transmits the transaction identifier to the browser 112 in data transfer 220 so that the browser may display a QR code 114 representing the transaction identifier to the consumer.

Figure 3:
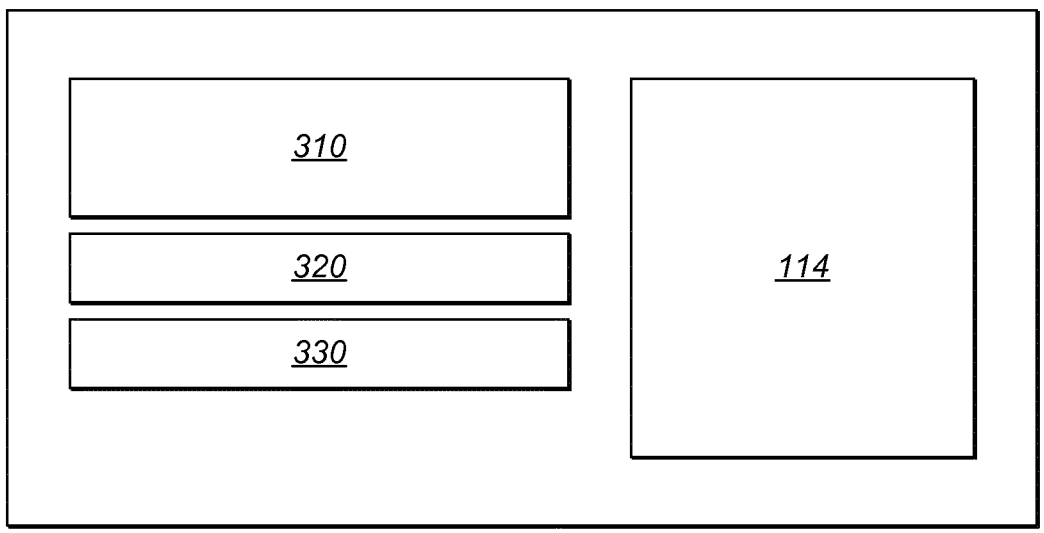
FIG. 3 shows a display on the terminal of FIG. 1 when the consumer is purchasing a product from the merchant.

FIG. 3 shows an example of a browser display after the browser 112 has generated and displayed the QR code 114. Alongside the QR code 114, a basket description 310, which details the contents of the basket as earlier selected by the consumer using the browser 112, a basket amount 320, which shows the cost of the products selected by the consumer using the browser 112, and any available delivery details if the consumer selected a particular delivery option using the browser 112 upon 'check-out' of the basket, for example delivery costs and type.

The consumer may then use the app 122 on the mobile device 120 to scan the QR code 114 and extract the transaction identifier, thus transferring the transaction identifier from the browser 112 to the app 122 in data transfer 225.

So that the consumer may confirm the details of the transaction using the app 122, the app 122 transmits the transaction identifier to the communications gateway 150 in data transfer 230. The communications gateway 150 then uses the transaction identifier in data transfer 235 to retrieve from the database 144 all of the relevant transaction information associated with the transaction code. The database 144 returns the relevant transaction information to the communications gateway 150 in data transfer 240 for forwarding on to the app 122 in data transfer 245. In particular, the merchant name and basket amount associated with the transaction code are retrieved, along with any other relevant information, such as the tracking reference, any delivery information and product description(s) and/or product photograph(s) that may be available.

The received transaction information is displayed to the consumer by the app 122. In particular, the name of the merchant and the basket amount are displayed to the consumer so that the consumer may confirm that the merchant name is correct before completing the transaction. Furthermore, the tracking reference, as well as any delivery information and product description(s) and/or product photographs(s) that may be available may also be displayed so that these may also be confirmed by the consumer before completing the transaction.

In order to complete the transaction, the consumer may select a 'confirm' button on the app 122, which transmits an instruction from the app 122 to the communications gateway 150 in data transfer 250 so that the communications gateway may execute the transaction. The transaction may be executed for example using a Faster Payments Service transfer or any other payment mechanism, from a source of funds of the consumer, for example a bank account, credit card or payment wallet that the consumer linked to the app 122 when registering the app 122 with the transaction provider, to an account that the merchant specified when registering for the transaction service, wherein the merchant to be paid and the amount to be paid is obtained by the communications gateway 150 from the database 144 using the transaction identifier included in the transaction instruction. The communications gateway may have the capability to execute the transaction itself using that information, or to instruct a financial institution to do so, and so may alternatively be described as a transaction processing server.

The communications gateway 150 will update the database 144 with a record of the payment status for each transaction identifier, for example payment instructed, payment completed successfully etc, so that the progress of the payment can be monitored.

Use of this transaction service means that the consumer can save time because they do not need to spend time entering their payment details into the terminal 110 in order to execute the transaction. It also improves security for the consumer because their payment details are not being transferred to a merchant, where the security of the payment details may be compromised either in transfer or whilst with the merchant.

In order to save time whilst using a normal transaction process, some consumers may choose to save their payment details either on the terminal 110, on their mobile device 120 or on the merchant server 130. However, this means that payment details may be stored and used at multiple locations, some of which may not be very secure. With the transaction service of the present disclosure, the consumer payment details linked to the app 122 by the consumer when registering the app may be stored in a single, secure location. Because the communications gateway 150 may itself execute the transaction for the transaction provider, there may be an improvement in security both in storage of payment details and in the transferring of payment details. It also means that payment details are not shared with the merchant, which again improves security for the consumer and reduces the data security burden placed on the merchant.

Furthermore, by executing the above described steps, the consumer can be sure with whom they are dealing in the transaction and, therefore, who will ultimately receive their money, which introduces two factor authentication control for the consumer. For example, if they are shopping on a $3^{rd}$ party's website which is imitating a particular merchant, the merchant ID retrieved by the $3^{rd}$ party website during the transaction steps will be the merchant ID linked to the $3^{rd}$ party, not the merchant ID for the imitated merchant because each merchant can only use their own API to retrieve the merchant ID that is verified as being associated to them. Consequently, the merchant ID associated with the transaction identifier on the database 144 will be the merchant ID for the $3^{rd}$ party. Thus, when the app 122 transmits the transaction identifier to the communications gateway 150 in data transfer 230, the communications gateway 150 will return the name associated to the $3^{rd}$ party merchant ID, rather than the name of the imitated merchant. The name of the $3^{rd}$ party will be displayed to the consumer before they complete the transaction so that the consumer may cancel the transaction before any money or personal data is transmitted to the $3^{rd}$ party.

Even if a $3^{rd}$ party were able to obtain a merchant ID associated with a different merchant, only the merchant name for the merchant ID sorted in the database 144 will be displayed to the consumer and used for the transfer of money. Thus, if a fraudulent $3^{rd}$ party submits a different merchant's ID to the database 144 in order to imitate that different merchant, the different merchant's name will be displayed on the app 122 and any transferred money will go to the account linked by the different merchant to their merchant ID. Thus, the fraudulent $3^{rd}$ party will not receive any money from the consumer.

Also, if the merchant were to increase the basket amount without notifying the consumer and include the increased amount in data transmission 215 in order to have that increased amount in the transaction information ultimately used for the transaction this will again be identified by the consumer before confirming the transaction. The increased basket amount will form part of the transaction information returned to the app 122 in data transfer 245 so the consumer will see the increased amount and may cancel the transaction before any money has been transferred.

Furthermore, if a fraudulent $3^{rd}$ party, or indeed the consumer themselves, were to try to set a lower basket amount by intercepting data transmission 215 and changing the transaction information, the encryption or other integrity controls applied to data transmission 215 will prevent them from successfully doing so.

Furthermore, because the data transfers between the app 122 and the communications gateway 150 may be secured, for example using SLL, a $3^{rd}$ party may not be able to intercept any of data transfer 230, 245 or 250 and alter the transaction identifier in order to execute a different transaction from which they may benefit. Alternatively, or additionally, the app 122 and the communications gateway 150 may implement message integrity controls in order to protect their communication, and the communications gateway 150 may also ensure that only legitimately registered apps may interact with the transaction server and maintain authentication lockout counts against the app 122.

For some products, the merchant may require that personal attributes of the consumer are submitted before the transaction can be completed. In such cases, the merchant may indicate the personal attributes that they require at the same time as transmitting transaction information in data transfer 215 by including an attribute query. For example, for products that must be delivered to the consumer, the attribute query may be for a delivery address. The attribute query may include a policy decision specifying a requirement that each attribute submitted by the consumer must meet before the transaction is allowed to take place, for example a particular age range that the consumer must fall within or a particular area, such as the UK, that the delivery address must be within, and/or the attribute query may include a requirement that submission of the attribute by the consumer is compulsory or merely optional.

Where the merchant has submitted an attribute query, before completing the transaction with data transfer 250, the consumer may be asked to submit attribute information, for example a delivery address, and potentially also confirm that they are happy to share the information with the merchant.

Figure 4:
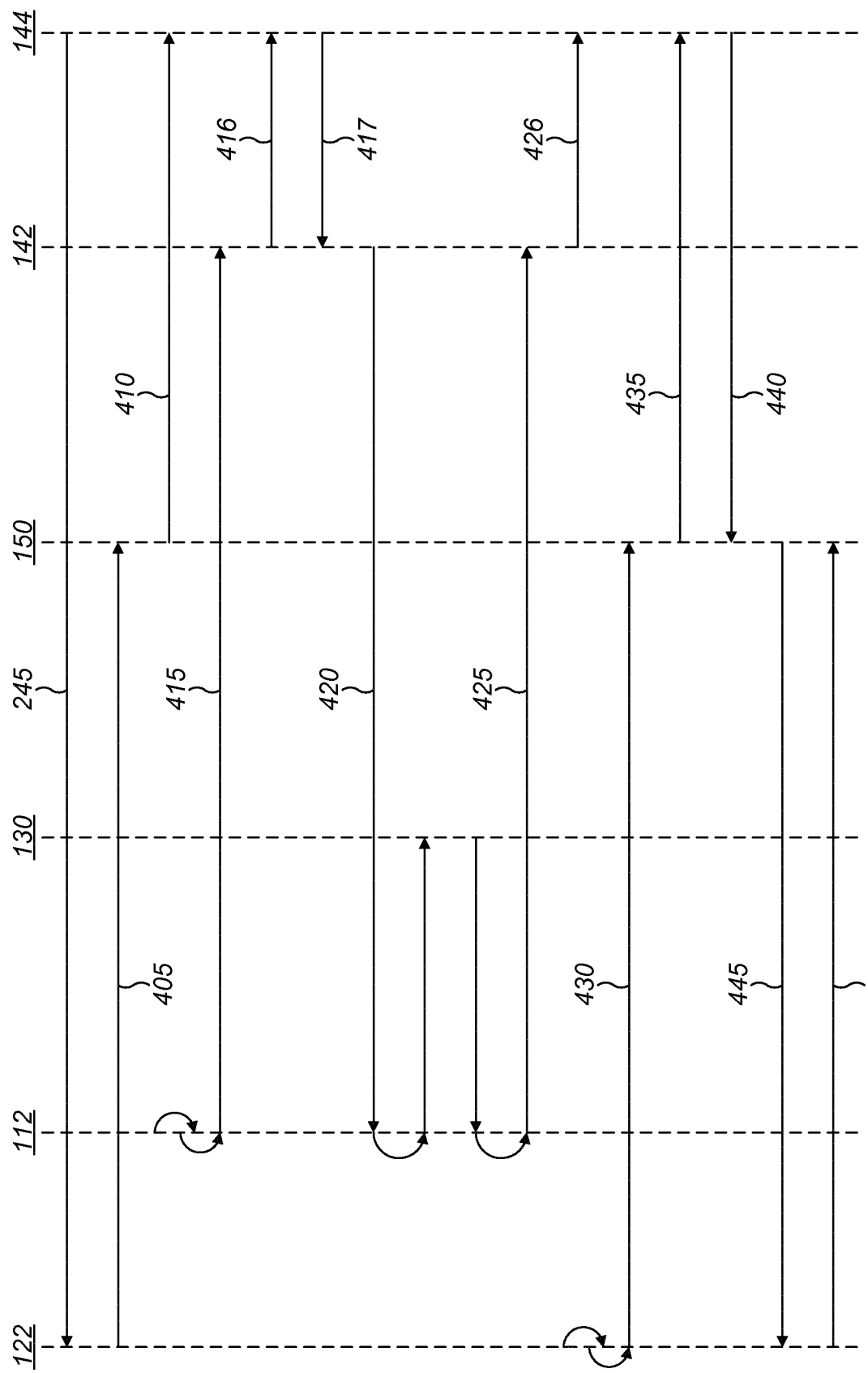
FIG. 4 shows a sequence diagram for the system shown in FIG. 1 for the submission of attribute information from the consumer when the consumer is purchasing a product from the merchant.

FIG. 4 shows an example sequence diagram that may take place between data transfers 245 and 250. Included in the transaction information retrieved from the database 144 in data transfer 240 and forwarded to the app 122 in data transfer 245 may be any outstanding attribute queries stored in the transaction information on the database 144. Upon receipt of an attribute query, the app 122 will prompt the consumer to submit the necessary information.

If the attribute query submitted by the merchant allows it, the consumer may be given the option by the app 122 to enter the required information, for example delivery address, date of birth/age or email address, into the app (or have the app 'auto-complete' the required information from information saved to the app 122 or device 120, which might require the consumer to select a particular address, for example, from a selection of addresses they have saved), or to use the information that the user registered with the transaction provider when setting up the app 122, or to use information that may be obtained from an external source, such as a credit rating agency. Because the information from an external source may have been verified by that external source (for example, using KYCS/AML/Longevity etc), or the information that the user registered with the transaction provider when installing and setting up the app 122 may have been verified by the transaction provider (again using, for example, KYC/AML/Longevity etc) and therefore be more reliable, the merchant may specify as a policy decision in the attribute query that only the information registered with the transaction provider may satisfy the attribute query. In this case, the app 122 will allow the consumer only the option of confirming that they are happy to use the information registered with the transaction provider, or cancel the transaction.

The attribute information registered by the consumer with the transaction provider may also be included in data transmission 245 so that the consumer may review the registered attribute information before confirming that it should be used. For example, the registered delivery address may the transmitted, or a request for confirmation that the registered details are correct, such as 'Our records say that you are over 18, please confirm Yes or No' etc. If allowable according to any merchant policy decisions, the consumer may be given the option of editing registered attribute information and then subsequently use the edited attribute information for the transaction. They may also have the opportunity to indicate that the edited attribute information should replace the attribute information registered with the transaction provider.

Furthermore, where there are alternative attributes registered with the transaction provider (for example, different delivery addresses for work and home) data transmission 245 may include all of the alternative attributes registered so that the consumer may select which of them should be used for this transaction.

In data transfer 405 from the app 122 to the communications gateway 150, the consumer transmits either the required attribute information or a confirmation that the required attribute information registered with the transaction provider is to be used. If necessary the communications gateway 150 will then retrieve from the transaction provider the registered attribute information associated with the app 122, which may be kept, for example, in the communications gateway 150, or the database 142, or at some other location. The attribute information may then be added to the transaction information on the database 144 in data transfer 410.

If all of the attribute queries may be resolved and the submitted attributes meet any policy decisions earlier submitted by the merchant server 130, the transaction information may be updated, for example by the database 144 or the communications gateway, to indicate that the transaction is allowed to take place.

Where the merchant would like to review the submitted attribute information before allowing the transaction to take place, for example in order to calculate delivery charges based on the submitted delivery address, or ensure the consumer meets the merchant's age requirement, or to apply a discount for consumers falling within a particular age range, such as pensioners, the browser 112 may conduct regular polling, i.e. a pull request, of the transaction provider node 142.

Data transfer 415 shows a polling of the transaction provider node 142, where a polling request citing the transaction identifier and the attribute information required is sent to the transaction provider node 142. In response to the polling, the transaction provider node 142 may request the required attribute information from the database 144 in data transfer 416 and then receive the requested information in data transfer 417 if the requested information has been added to the transaction information on the database 144, for example if the consumer has added their delivery address to the database 144 in earlier data transfers 405 and 410. Having received the requested attribute information, the transaction provider node 142 will generate an attribute confirmation token and send it to the merchant server 130 via the browser 112 in data transmission 420. The attribute confirmation token may also include an indication of how trustworthy the attribute information is, for example if it is from a verified source, such as the information that the consumer registered with the transaction provider, or an external source such as a credit rating agency, it may be marked as very trustworthy. However, if the consumer has just submitted the attribute information themselves, it may be marked as potentially untrustworthy. This allows the merchant server 130 to make policy decisions regarding whether or not to go ahead on the basis of how trustworthy the information is.

Having received the requested attribute information, the merchant server 130 will return the relevant transaction information update to the transaction provider node 142 via the browser 112 in data transfer 425. For example, the information update may be a delivery charge calculated based on the delivery address and any other factors determined by the merchant, for example if the consumer is a member of a VIP delivery service etc, or a basket discount based on the consumer's age, or a confirmation that transaction is allowed to proceed on the basis of the consumer attribute information, which will result in the transaction information being marked to indicate that the transaction is allowed to take place. The transaction provider node 142 will send the information update to the database 144 in data transfer 426 so that it can be included in the transaction information.

Like data transmission 215, data transmissions 420 and 425 may be encrypted or have other integrity controls applied.

After the app 122 has transmitted the attribute information to the database 144 in data transmission 405, it too may poll the database 144, i.e. make a pull request, for any subsequent changes in the transaction information. Data transfer 430 shows a polling of the communications gateway 150, in response to which the communications gateway will request any updates in transaction information from the database 144 in data transmission 435. The current transaction information will be returned to the communications gateway 150 in data transfer 440 for forwarding on to the app 122 in data transfer 445.

The app may then update the information it displays to the consumer to reflect the current transaction information, for example so that the amount payable to the merchant includes the delivery cost. In this way, the consumer will be aware of the total amount that will be paid to the merchant before instructing completion of the transaction in data transfer 240.

Polling by the app 122 may continue until the returned transaction information indicates that the transaction is now allowable, at which time the app 122 will offer the consumer the opportunity to confirm that the transaction should take place.

The above transaction process may be configured to enable the use of coupons or discounts applied by the consumer and/or the merchant. In one example, the merchant may release a set of coupons or discounts which the consumer may obtain and submit to the transaction provider for keeping in their account with the transaction provider. After receiving data transfer 405, at the same time as obtaining from the transaction provider any relevant attribute data registered by the consumer, the communications gateway 150 may also obtain any coupons and/or discounts issued by the merchant that the consumer has saved in their transaction provider account. Those coupons and/or discounts are then sent to the database 144 in data transfer 410 and the transaction information in the database 144 is updated accordingly, for example to apply a 10% discount to the basket amount, or apply a fixed amount reduction from the basket.

Alternatively, the merchant may include an attribute query for coupons and/or discounts in data transfer 215, so that after receiving data transfer 245, the app 122 may prompt the consumer to enter any coupons and/or discounts that they may have. Any entered coupons and/or discounts may then be included in data transfer 405 and applied to the transaction information on the database 144.

The consumer may be notified of any changes made as a consequence of a coupon and/or discount in data transfer 445, which updates the app 122 with the current transaction information held on the database 144. The merchant may be notified of any changes made as a consequence of a coupon and/or discount by polling the transaction provider node 142 with a request for the information, in an analogous manner to the merchant polling process for attribute information described above. Alternatively, the merchant may be notified only in the transaction confirmation that they receive after a transaction has taken place successfully (which is explained in more detail below).

Coupons and/or discounts may be applied by the merchant, for example where the merchant offers a discount to the consumer for using the transaction provider's service to carry out the transaction, or for special offers such as a discount for their $1000^{th}$ customer etc. Such coupons and/or discounts may be included in data transfer 215, such that the consumer will be notified of the discount and/or coupon applied when the app 122 receives data transfer 245. Alternatively, or additionally, the merchant may apply coupons and/or discounts to the transaction information later during the process, for example after receiving attribute information in data transfer 420, a discount/coupon may be applied in data transfer 425. If they are applied at that time, the consumer may be notified of them in data transfer 445, which updates the app 122 with the current transaction information held on the database 144.

The above transaction process may also be configured to make use of merchant and/or consumer reputational information, which might be a score out of 10 and/or a review of the merchant/consumer and/or a credit score of the merchant/consumer. Reputational information may be, for example, crowd sourced from parties who previously had dealings with a consumer or merchant and have submitted a rating for them, or from outside sources such as credit ratings agencies.

A merchant rating may be held by the transaction provider node 142 for each merchant registered with them. The merchant rating may come from reviews and ratings submitted by previous consumers using the transaction service for a transaction with that merchant, in which case the transaction provider node 142 may look up their merchant rating for the merchant ID sent to them in data transfer 215. Alternatively, after receiving data transfer 215, the transaction provider node 142 may obtain the merchant rating from an external source, for example a credit ratings agency or another service provider who has a rating for the merchant. The merchant rating may then be included in the transaction information in data transfer 216 so that the transaction information sent to the app 122 in data transfer 245 may include the merchant rating, thus allowing the consumer to consider the merchant rating before confirming the transaction.

A consumer rating may similarly be held by the transaction provider node 142 for each app 122 registered with them, or it may be obtained from an external source. Again, the consumer rating might be a score out of 10 and/or a review of the consumer and/or a credit score of the consumer.

The merchant may include in data transfer 215 an attribute query for a consumer rating and then set up a polling request for the consumer rating as part of the attribute information polling 415 and thus receive the rating in data transfer 420. The merchant server 130 may then make a decision whether or not the transaction should be allowed to take place, which may be included in data transfer 425 and recorded on the transaction information on the database 144. Alternatively, the attribute query may include a policy decision requiring a minimum consumer rating that must be achieved for the transaction to be allowed to take place. In this case, the merchant server 130 may not need to undertake polling for the consumer rating as the database 144 may automatically update, or be updated by the transaction provider node 142 or the communications channel 150, to indicate whether or not the transaction should be allowed to take place on the basis of the consumer rating received in data transfer 410.

Alternatively, the polling request 415 may ask the transaction provider node 142 for a consumer rating, which the transaction provider node 142 may obtain from the transaction provider's records or from an external source by the communications gateway 150, add to the transaction information on the database 144 and return to the consumer server 130 in data transfer 420. The polling request 415 may also include a policy decision, in which case the merchant server 130 may not need the consumer rating to be returned, but instead trust that the transaction provider node 142 will indicate in the transaction information on the database 144 whether or not the transaction is allowed to take place on the basis of the consumer rating it obtains.

Once the transaction has been confirmed by the app 122 in data transfer 250, confirmation of a successfully executed transaction may be sent to the browser 112 and the merchant server 130 so that both parties may have a receipt of the transfer and so that the merchant may perform any further required acts, for example delivery of the product to the consumer.

Figure 5:
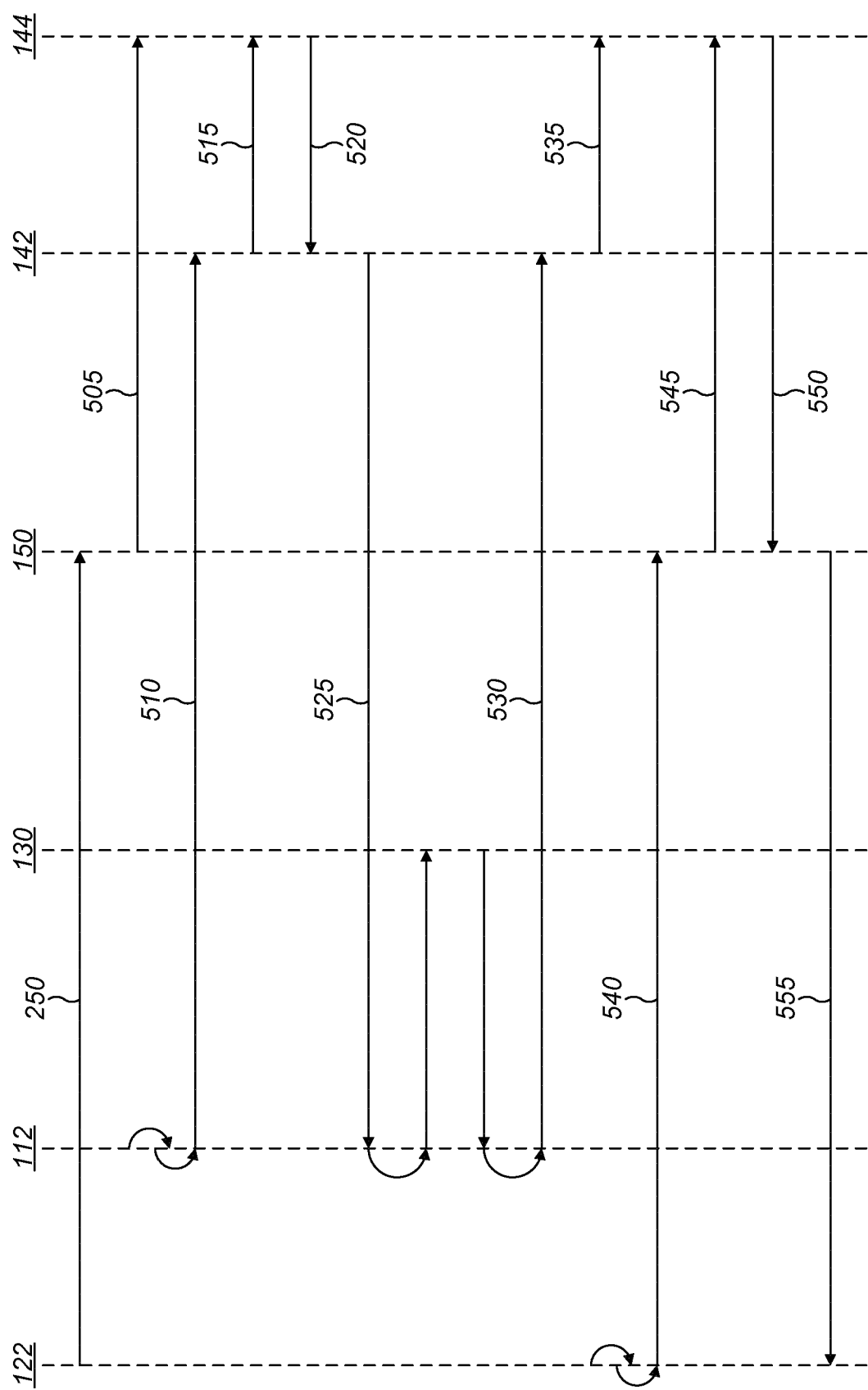

A process of transaction confirmation is shown in FIG. 5, which begins with the communications gateway 150 updating the database 144 in data transfer 505 to record in the transaction information a successful transaction.

The merchant may obtain confirmation by instructing the browser 112 to poll the transaction provider node 142 in data transfer 510 for confirmation of a successful transaction. In response to a polling request, the transaction provider node 142 may use the transaction identifier to check the current payment status on the database 144 in data transfer 515. If the current payment status indicates that the transaction has been completed successfully, the transaction provider node 142 will have returned to it in data transfer 520 a confirmation of successful transaction, which might include any relevant transaction information, for example what the transaction amount was, the tracking reference for the order, the time and date of payment and some attribute information, such as a delivery address. Using this information, the transaction provider node 142 may generate a payment confirmation token and send return that to the merchant server 130 via the browser 112 in data transfer 525. At the same time, the transaction provider node 142 may update the database 144 to record in the transaction information that the payment confirmation token has been sent to the browser 112.

If the transaction has not yet been marked on the database 142 as having taken place successfully, the transaction provider node 142 may return to the merchant server 130 an indication that there is no record of a successful transaction yet so that polling should continue.

The transaction provider node 142 may apply a digital signature and encryption or other integrity controls to the payment confirmation token so that the merchant server 130 can confirm who the payment confirmation token was issued by and that the payment confirmation token has not been tampered with. As explained above, any keys that are issued to the merchant server 130 and transaction provider node 142 for such purposes may be stored using software, or more preferably in a hardware protected key store (HSM) for additional security.

Having received the payment confirmation token, the merchant server 130 may use the transaction provider API that they were provided with when signing up to the transaction service to obtain the functions and orchestration that they require to carry out authentication and/or decryption. Having obtained and verified and/or decrypted the payment confirmation token, the merchant server 130 will be aware that the transaction has taken place successfully and can check that the transaction amount confirmed in the token is the amount that they requested. The merchant may also go about fulfilling the product order, for example by dispatching the product(s) to the consumer's delivery address, and may issue a receipt of purchase to the consumer, for example by post or to an email address of the consumer also included in the payment confirmation token as part of the attribute information held on the database 144.

Furthermore, the merchant server 130 may also update the browser 112 to confirm to the consumer that the transaction has taken place successfully and present the consumer with any relevant information, for example the tracking reference for the order, a confirmation of the transaction amount and an estimated delivery period.

The merchant server 130 may also generate an acknowledgement of receipt of the payment confirmation token and transmit that to the transaction provider node 142 via the browser 112 in data transfer 530. In this way, the transaction provider node 142 can be sure that the merchant server 130 has safely received and processed the payment confirmation token and thus update the transaction information in data transfer 535 to the database 144 to mark that the interaction has been completed. Furthermore, the transaction provider node 142 may also issue a confirmation of successful transaction to the mobile terminal 110 after receipt of the acknowledgement. The confirmation may be, for example, a text message, an email or a voice message.

The app 122 may also poll the communications gateway 150 in data transfer 540 to request an update on the transaction status. The communications gateway 150 may check the transaction status recorded in the transaction information in the database 144 in data transfer 545 and return the transaction status and any other relevant information in data transfer 550. The app 122 may then have returned to it in data transfer 555 an indication of the transaction status. If the transaction status marks the transaction as successful, the app 122 will be able to display to the consumer a confirmation of successful transaction, with any other relevant returned information, for example the tracking reference and the amount of money transferred. If the transaction status marks the transaction as not yet having taken place, data transfer 555 will notify the app 122 accordingly so that it may continue to poll the communications gateway 150 until it receives a confirmation of successful transaction.

By always referring to the transaction status on the database 144 in these checking steps, if any communications between the transaction provider node 142, the browser 112 and the merchant server 130, and also between the app 122 and the communications gateway 150, should fail, the confirmation process may be repeated until successful without initiating a second, duplicate transaction. For example, if the transaction provider node 142 issues a payment confirmation token to the merchant server in data transfer 525, it may then wait for an acknowledgement of receipt and reissue the payment confirmation token to the merchant server 130, for example with a 'push' to the merchant server 130, if no acknowledgement is received. Therefore, any failure in data transfers 525 or 530 can easily be rectified.

Furthermore, the checking steps mean that the transaction may be checked by the merchant and the app 122 at any later time, since the transaction status is kept with the transaction information on the database 144 and may be identified at any time using the transaction identifier. Thus, the merchant could check historical transactions at any time and receive confirmation that the transaction was successful, along with any other transaction information that they may desire.

Figure 6:
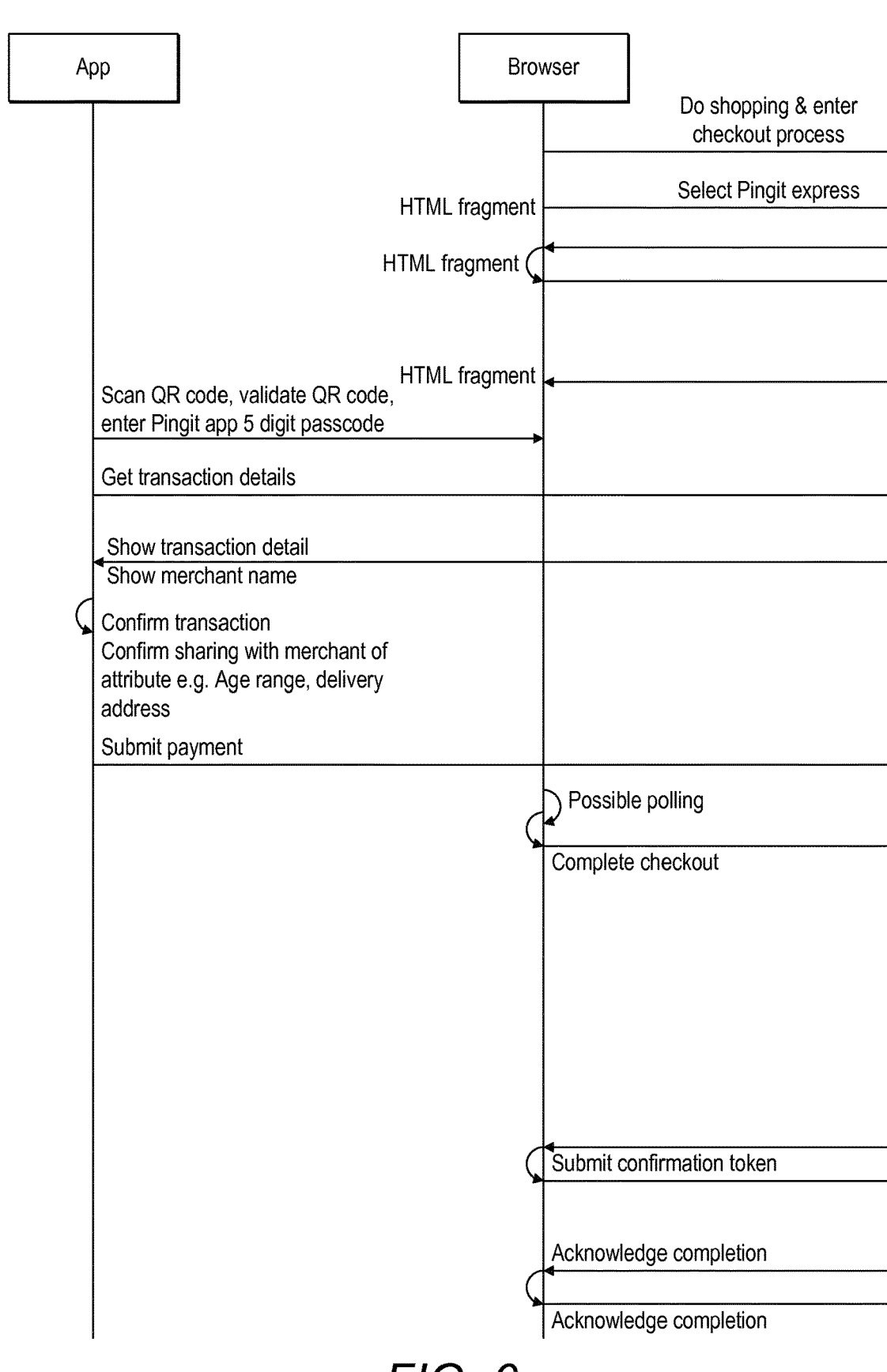
FIG. 6 shows a sequence diagram for the system of FIG. 1 when the consumer is purchasing a product from the merchant.
Figure 6:
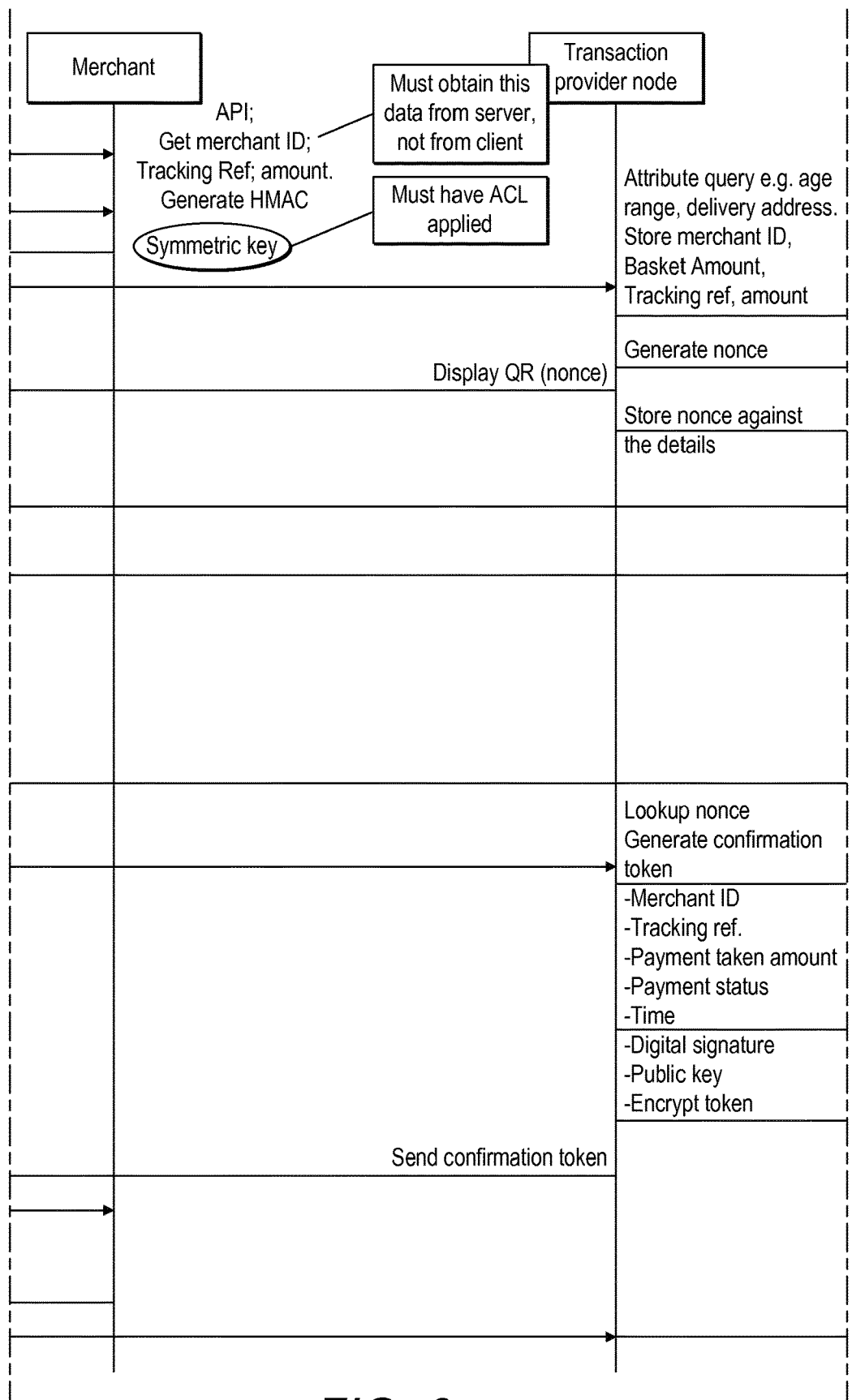
Figure 6:
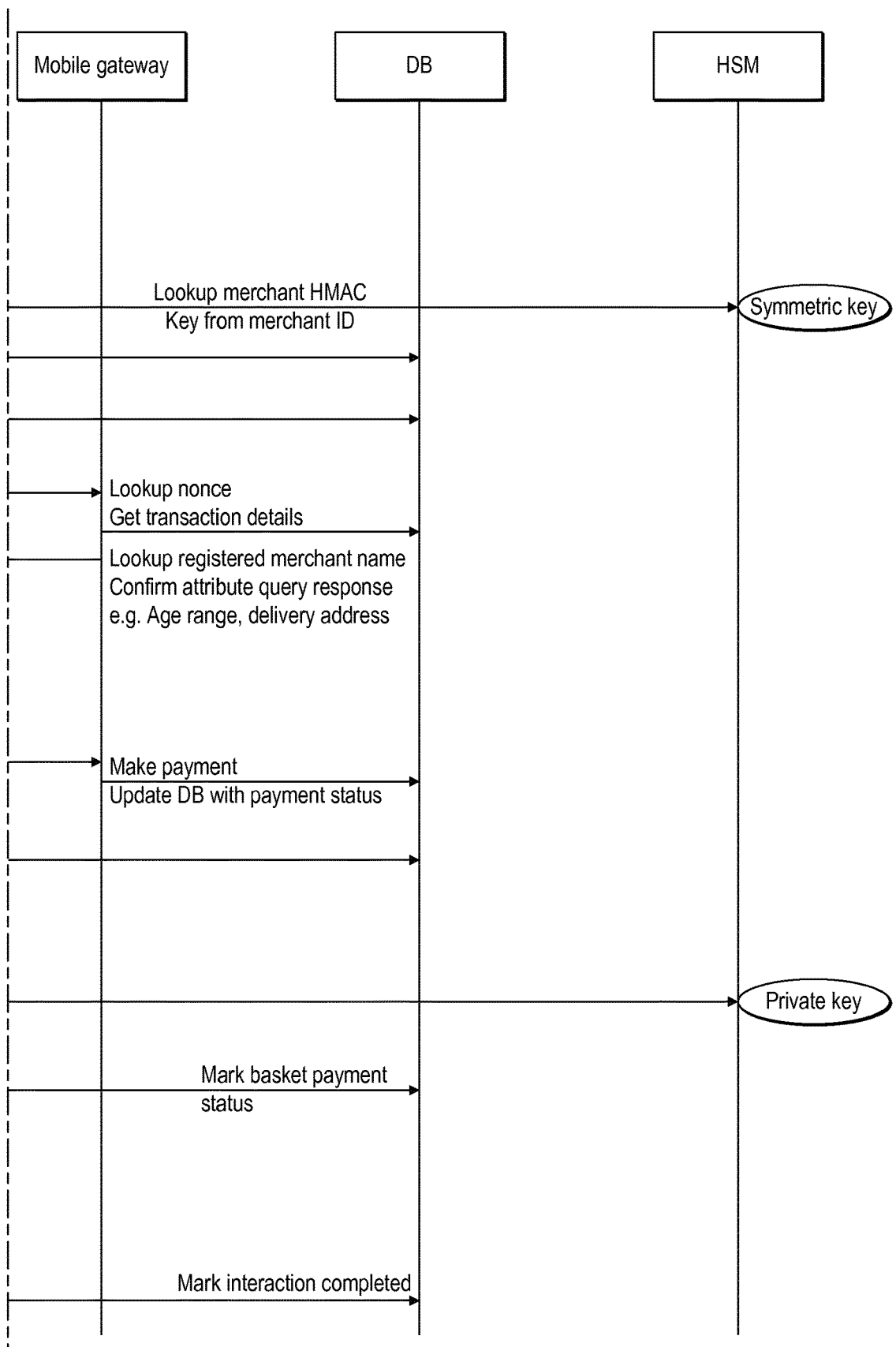

FIG. 6 shows a complete sequence diagram for a consumer purchasing a product from a merchant using a browser on a first terminal and an app on a mobile terminal, including the confirmation process for the merchant.

The skilled person will appreciate that various modifications of the above described aspects are possible without departing from the spirit and scope of the present disclosure.

For example, the database 144 may be co-located with the transaction provider node 142 on the server 140, or may be located remotely from the transaction provider node 142 and the server 140.

The terminal 110 may be a personal computing device, such as a desktop computer or a mobile computing device such as a tablet computer, or it may be a computing device located in, for example, a merchant's shop. The consumer may then access the merchant's website, or an area in any relevant network location, for example the merchant's intranet page, and enter the checkout process from there. If the product can be collected in the shop and there are no attribute queries from the merchant, the transaction may be allowed to proceed without any submission of personal details from the consumer. Then, having used their mobile terminal 110 to carry out the method described above, the consumer may show their transaction receipt to a member of staff in the shop and collect their purchased product(s).

In the above described method, the merchant server 130 obtains the merchant ID after data transfer 205, when the consumer enters the checkout process. Alternatively, the merchant server 130 may obtain the merchant ID after data transfer 210, where the consumer has confirmed their desire to use the transaction provider's service.

Furthermore, rather than carrying out data transfer 215 and having the transaction provider node 142 generate a transaction identifier and store the transaction information with the transaction identifier on the database 144, the merchant server 130 may be configured to generate a QR code 114 for display on the browser 112. The QR code 114 may comprise merchant information, the basket amount and the tracking reference, as well as any attribute queries and policy decisions that there may be, so that when the app 122 scans the QR code 114, that information is imported into the app 122. A digital signature may also be included in the QR code 114 and/or the data in the QR code may be encrypted or have other integrity controls applied. For example, a symmetric key technique, such as keyed-hash message authentication code (HMAC), described above may be employed.

Having imported this data by scanning the QR code, the app 122 may transmit all of the data to the communications gateway 150 for verification. The communications gateway 150 may verify the data in the same way as that described above in respect of the transaction provider node 142 verifying data transfer 215 (i.e. the communications gateway 150 will look up the symmetric key etc associated with the merchant ID and verify that the data imported into the app 122 from the QR has come from the correct merchant and has not been tampered with). Having verified the data, the communications gateway 150 will return the transaction amount and merchant information to the app 122 in data transfer 245, as above. Furthermore, it will also store on the database 142 all of the transaction information included in the QR code and associate it with the tracking reference included in the QR code. Thus, the transaction process and confirmation process may then be executed as described above, but using the tracking reference, rather than the transaction identifier, to look up the transaction information on the database 144.

Alternatively, rather than the communications gateway 150 adding the transaction information to the database 142 and associating it with the tracking reference, the merchant server 130 may submit to the database 144 the transaction information that it included in the QR code 114 that it generated.

Also alternatively, rather than transmitting the QR code data to the communications gateway 150 for verification, the app 122 may have access and/or hold the necessary tools, for example the symmetric key etc, to carry out decryption and verification of the transaction information in the QR code. If the information is verified, the app 122 may then proceed directly to data transfer 250 and execute the transaction on the basis of the information obtained from the QR code.

Rather than using a QR code to represent the transaction identifier, the browser 112 may display the transaction identifier using any form of graphical representation of data that may be scanned using the app 122, for example a barcode, or that may be input to the app 122 by any other means, for example it may be a textual code that is manually input to the app 122 by the consumer.

Furthermore, in the above described aspects, there is provided a terminal 110 with a browser 112 and a mobile terminal 120 with an app 122. However, there may be only a single terminal with both a browser 112 and an app 122. The above described process may still operate in the same way, except that rather than transmitting the transaction identifier to the browser 130 in data transfer 220 for display of the transaction identifier in a graphical form on the browser 130, it may be transmitted in data transfer 220 for transmittal by another means, for example via a keystore, shared memory, common file store, a URL or an 'intent', to the app 122 within the single terminal. For example, the transaction reference may be transmitted in data transfer 220 in a URL that prompts the app 122 to start-up with the transaction identifier. After the app 122 has received the transaction identifier, the app 122 and the browser 112 may then carry out the process described above in order to execute and confirm the transaction.

Furthermore, in the above described aspects, both the app 122 and the browser 112 perform polling, or pull requests, in order to obtain any required information. The polling may automatically be executed periodically until the required information has been received, or it may be executed when the consumer requests it, for example by pressing a 'check now' button on the app 122 and/or browser 112.

Alternatively, or additionally, any information required by the app 122 and the browser 112 may be transmitted by, for example, a push architecture, or by any other means. For example, a push architecture may use websockets between the communications gateway 150 and the app 122, and between the transaction provider node 142 and the browser 112 and/or merchant server 130, and transmit the necessary information as soon as the necessary information has been added to the database 144.

In the above disclosure and accompanying drawings, the transaction provider node 142 and the database 144 address each other directly, however, they may transfer data via an intermediary, for example the communications gateway 150.

In the above described aspects, the only personal information that the merchant server 130 requests in an attribute query is a delivery address and a date of birth of the consumer. However, any other consumer information that the merchant requires may be requested in an attribute query and then subsequently obtained from the consumer and shared with the merchant.

Furthermore, rather than the transaction provider node 142 generating, for example, a nonce, as the transaction identifier, the transaction identifier may instead be anything that may be linked on a database to the transaction information. For example, it may instead be an identification number, such as a customer ID or item number (for example an item number for a lot in an auction) that may be provided to the transaction provider node 142 by the merchant server 130 in data transfer 215.

In the above described aspects of the present disclosure, no direct server-to-server communication takes place between the merchant server 130 and the transaction provider node 142. Instead, where data is transfer between the two, it is transferred via the browser 112 (for example data transfer 215). Alternatively, server-to-server communication may be executed between the merchant server 130 and the transaction provider node 142, for example by using a mutual SSL connection between the two, by configuring the merchant server 130 and the transaction provider node 142 accordingly.

Furthermore, the above described process may be used for purposes other than for the purchase of a product with a transfer of funds from a consumer to a merchant. It may instead be used, for example, to carry out only an attributes check. In this case, the consumer may use the browser 112 to indicate to the merchant server 130 in data transfer 205 that they would like to do something that requires the merchant to check an attribute of the consumer, for example entering an over 18s gambling website. In data transfer 210 the consumer may indicate to the merchant server 130 that they would like to use the transaction provider's service in order to authenticate their age. The transaction information sent by the merchant server 130 to the transaction provider node 142 will include the merchant ID and an attribute query.

Data transfers 220, 225, 230, 235 and 240 may proceed as described above, but data transfer 245 will be different in that the transaction information returned to the app 122 will be a request for the consumer to confirm that they would like to confirm their age using the date of birth they registered with the transaction provider, and also optionally merchant information so that the consumer may confirm that the correct merchant is requesting the information. The consumer can then confirm in data transfer 405 that they are happy to share their registered age/date of birth with the merchant, after which data transfers 505, 510, 515, 520 and 525 may proceed as described above so that the merchant server 130 can decide whether or not to grant the consumer access to their website and update the browser 130 accordingly. Optionally, the merchant server 130 may also use data transfer 530 and 535 to update the database 144 to record their decision for future purposes.

Likewise, the process may also be used only for the purpose of applying coupons and/or discounts available through the transaction provider. In this case, the attributes check described above may include only a coupon/discounts attributes check, and after any suitable coupons/discounts have been applied to the transaction information, the updated transaction information may be transmitted from the transaction provider node 142 to the browser 112 to update the browser 112. The consumer may then complete the transaction using just the browser 112 in any known way.

In the above described aspects, the consumer registers a source of funds and attribute information with the transaction provider at the time of setting up and registering the app 122. However, a source of funds and attribute information may instead be registered and/or updated with the transaction provider and associated with the app 122 at any time after installing the app 122.

In the above described aspects, where transaction information may need to be updated on the basis of submitted attribute information, for example calculating and adding a delivery charge based on the delivery address, the merchant server 130 requested the required attribute information and then updates the transaction information accordingly. However, the merchant may delegate this functionality to the transaction provider node 142 or the communications gateway 150 by providing them with a set of rules to use. For example, in order to satisfy a delivery charge attribute query in the transaction information, the transaction provider node 142 or the communications gateway 150 may use the delivery address in the transaction information and a set of delivery charges rules provided by the merchant in order to calculate a delivery charge and then update the transaction information.

Furthermore, whilst the communications gateway 150, also referred to as the transaction processing server 150, is represented as a single functional block, it can be separated into a plurality of functional blocks according to suitable functional decomposition or performance imperatives.

Furthermore, rather than including the transaction amount in the transaction information in data transfer 215, the merchant server 130 could instead include only a tracking reference in the merchant ID. In this case, the transaction provider node 142 and/or the communications gateway 150 could use the merchant ID whenever necessary to call the merchant server 130 with the tracking reference in order to obtain the transaction amount from the merchant server 130. This may then be added to the transaction information on the database 144, or it may be kept off the database 144 and used immediately by the transaction provider node 142 (for example for transmission to the browser 112) or by the communications gateway 150 (for example, for transmission to the app 112 in data transfer 245, or to carry out the transaction).

Furthermore, rather than using a consumer's source of funds registered with the transaction provider, the app 122 may instead give the consumer the option of either using the registered source of funds or entering a different source of funds into the app 122 and using that. Furthermore, different sources of funds may be registered with the transaction provider and data transfer 245 may include a list of all of those so that the consumer may choose which, if any, they wish to use. The consumer's choice of source of funds may be communicated to the communications gateway in data transfer 250.

In the above described aspects, a record is maintained on the database 144 to indicate whether or not the transaction should be allowed to take place (i.e. whether or not all of the attribute queries have been satisfied etc). Alternatively, the communications gateway 150 may maintain a note on whether or not the transaction may be allowed to take place, for example by monitoring all attribute queries and policy decisions in the transaction information until all queries are resolved and all policy decisions complied with, at which time it will allow the transaction to take place by updating the app 122 to allow the consumer to confirm the transaction.

Furthermore, any one or more of the data transfers shown in the Figures may be made using open industry security tokens, such as security assertion markup language (SAML), or proprietary security tokens, in order to improve the security of communication.

The invention claimed is:

1. A computer implemented method for purchasing a product from a merchant by a consumer using an electronic device, the computer implemented method comprising the steps of:

at a merchant server:
causing a transaction processing server to store in a database an association between a transaction identifier and transaction information, the transaction information comprising a merchant identifier, which is associated with merchant information, and a transaction amount;
encrypting the transaction identifier using a symmetric key technique; and
transmitting, via a merchant website, the encrypted transaction identifier to a first terminal comprising a browser for display of the encrypted transaction identifier on the browser of the first terminal proximate to the electronic device;

at the electronic device:
transmitting the encrypted transaction identifier from an application to the transaction processing server;

at the transaction processing server:
without communicating with the merchant server:
after the merchant server transmits the encrypted transaction identifier to the first terminal for display of the transaction identifier on the browser of the first terminal, receiving, from an application on the electronic device, the transaction identifier extracted from the browser,
after receiving the transaction identifier from the electronic device, verifies the encrypted transaction identifier using the symmetric key technique by comparing the encrypted transaction identifier to a symmetric key associated with the merchant identifier; and
after verifying the encrypted transaction identifier:
obtain, from the database, merchant information and a transaction amount from the transaction information associated with the transaction identifier on the database;
transmitting, the merchant information and the transaction amount associated with the transaction identifier from the transaction processing server to the application;
transmitting from the transaction processing server to the application a consumer attribute query from the transaction information associated with the transaction identifier;

at the electronic device:
transmitting from the application to the transaction processing server the consumer attribute; and
transmitting confirmation to complete the transaction;

at the transaction processing server:
receiving from the application the consumer attribute;
updating the transaction information to include the consumer attribute, wherein the consumer attribute query comprises a delivery address query and the consumer attribute comprises a delivery address;
receiving, from the application, confirmation to complete the transaction; and
completing the transaction.

2. The method of claim 1, wherein the product is selected from the merchant website by the consumer through a browser.

3. The method of claim 1, wherein the consumer attribute transmitted by the application is an authorization to use a consumer attribute registered to the consumer with a transaction provider.

4. The method of claim 1, further comprising a step of:
updating the transaction information to include a delivery charge determined from the delivery address.

5. The method of claim 1, wherein the consumer attribute query comprises a consumer age query and the consumer attribute comprises a consumer age.

6. The method of claim 5, further comprising the steps of:
determining from the consumer age whether or not the transaction should be allowed to be completed and updating the transaction information accordingly.

7. A computer implemented system for use in the purchase of a product from a merchant by a consumer using an electronic device, the computer implemented system comprising:

a merchant server being configured to:
cause a transaction processing server to store in a database an association between a transaction identifier and transaction information, the transaction information comprising a merchant identifier, which is associated with merchant information, and a transaction amount; and
encrypt the transaction identifier using a symmetric key technique; and
transmit the encrypted transaction identifier via a merchant website to a first terminal comprising a browser for display of the encrypted transaction identifier on the browser of the first terminal proximate the electronic device, and the transaction processing server being configured to:
without communicating with the merchant server:
after the merchant server transmits the encrypted transaction identifier to the first terminal for display of the transaction identifier on the browser of the first terminal, receive from an application on the electronic device, the encrypted transaction identifier extracted from the browser;
after receiving the transaction identifier from the electronic device, verify the encrypted transaction identifier using the symmetric key technique by comparing the encrypted transaction identifier to a symmetric key associated with the merchant identifier;
after verifying the encrypted transaction identifier:
obtain, from the database, merchant information and a transaction amount from the transaction information associated with the transaction identifier on the database; and
transmit the transaction amount and merchant information to the application on the electronic device;
transmit to the application a consumer attribute query from the transaction information associated with the transaction identifier;
receive from the application the consumer attribute, wherein the consumer attribute query comprises a delivery address query and the consumer attribute comprises a delivery address;

receive, from the application, confirmation to complete the transaction; and complete the transaction.

8. The system of claim 7, wherein the consumer attribute query comprises a consumer age query.

9. The system of claim 7, being further configured to transmit a consumer attribute token to the merchant.

10. The system of claim 9, wherein the consumer attribute token comprises a consumer attribute and a consumer attribute reliability indicator.

11. The system of claim 10, wherein the consumer attribute reliability indicator is determined by the source of the consumer attribute.

12. The system of claim 7, being further configured to receive an update of the transaction information and store the update on the database.

13. The system of claim 7, wherein the transaction processing server is further configured to:

obtain a consumer attribute query from transaction information associated with the transaction identifier on the database;

transmit the consumer attribute query to the application on the electronic device;

receive a consumer attribute from the application on the electronic device; and add the consumer attribute to the transaction information associated with the transaction identifier on the database.

14. The system of claim 13 wherein the consumer attribute received from the application on the electronic device is an authorisation to use a consumer attribute registered by the consumer with a transaction provider, and the transaction processing server is configured to:

add the consumer attribute registered by the consumer with the transaction provider to the transaction information associated with the transaction identifier on the database.

15. An electronic device suitable for use by a consumer purchasing a product from a merchant, the electronic device being configured to:

after a merchant server:

causes a transaction processing server to store in a database an association between a transaction identifier and transaction information, the transaction information comprising a merchant identifier, which is associated with merchant information, and a transaction amount, and encrypts the transaction identifier using a symmetric key technique, and transmits the encrypted transaction identifier via a merchant website to a first terminal comprising a browser for display of the transaction identifier on the browser of the first terminal proximate the electronic device, and receive, at the electronic device, a transaction identifier, wherein the transaction identifier from the merchant server is associated on a database with transaction information, the transaction information comprising a merchant identifier, which is associated with merchant information, and a transaction amount;

transmit the encrypted transaction identifier to the transaction processing server;

after the transaction processing server without communicating with the merchant server:

receives, from an application on the electronic device, the encrypted transaction identifier extracted the browser, after receiving the encrypted transaction identifier from the electronic device, verifies the encrypted transaction identifier using the symmetric key technique by comparing the encrypted transaction identifier to a symmetric key associated with the merchant identifier; and after verifying the encrypted transaction identifier:

obtains, from the database, merchant information and a transaction amount from the transaction information associated with the transaction identifier on the database, and transmits the transaction amount and merchant information to the application on the electronic device, and transmits to the application a consumer attribute query from the transaction information associated with the transaction identifier, receive, at the electronic device, the merchant information and the transaction amount in response to the transmitted transaction identifier and the delivery address query;

transmit, at the electronic device, a consumer attribute, wherein the consumer attribute query comprises a delivery address query and the consumer attribute comprises a delivery address; and complete, at the electronic device, the transaction on the basis of the merchant information and the transaction amount by transmitting the consumer attribute and by transmitting a confirmation to the transaction processing server to complete the transaction wherein the transaction processing server completes the transaction.

16. The electronic device of claim 15, wherein the transaction information further comprises a consumer attribute query and the application is further configured to:

receive the consumer attribute query; and transmit a consumer attribute for inclusion in the transaction information on the database.

17. The electronic device of claim 16, wherein the consumer attribute is an authorization to use a consumer attribute registered by the consumer with a transaction provider.

18. The electronic device of claim 16, wherein the consumer attribute query comprises a delivery address query and the consumer attribute comprises a delivery address.

19. The electronic device of claim 16, wherein the consumer attribute query comprises a consumer age query and the consumer attribute comprises a consumer age.

* * * * *